March 18, 1930.   T. E. MURRAY, JR., ET AL   1,750,643
WELDING COPPER AND THE LIKE
Filed July 5, 1927   2 Sheets-Sheet 1
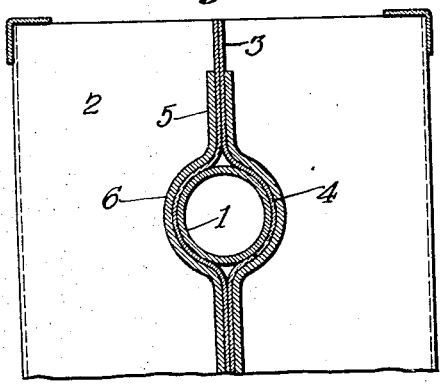
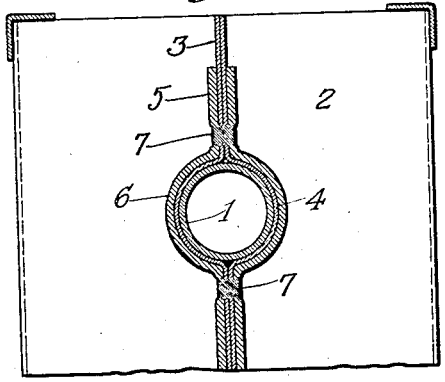
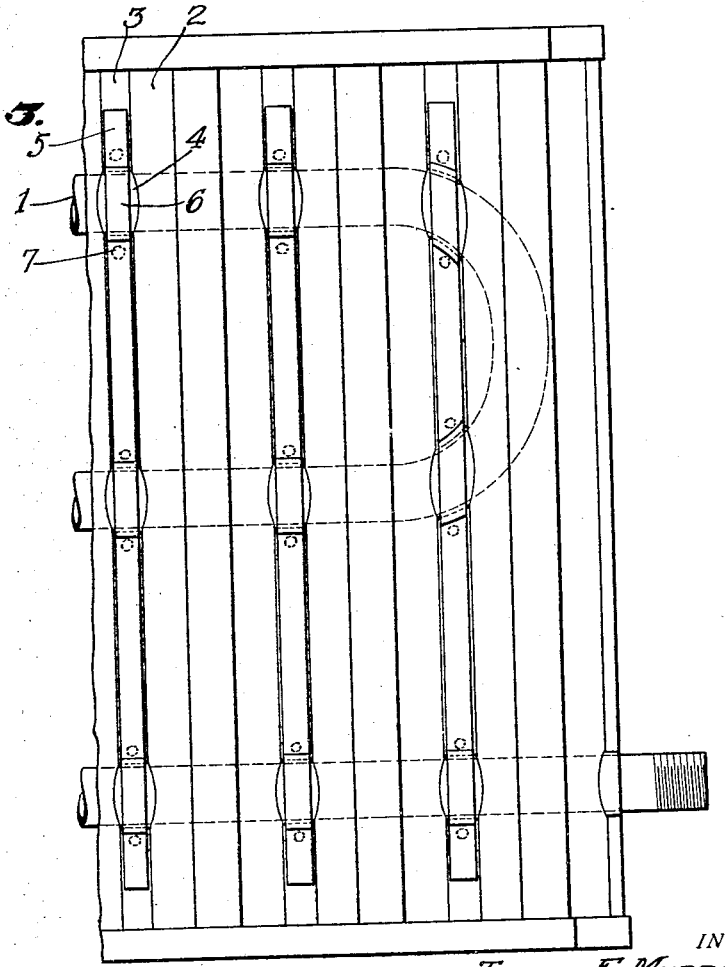
INVENTOR
THOMAS E. MURRAY JR.
IRVING T. BENNETT
BY
D. Anthony Usina, ATTORNEY

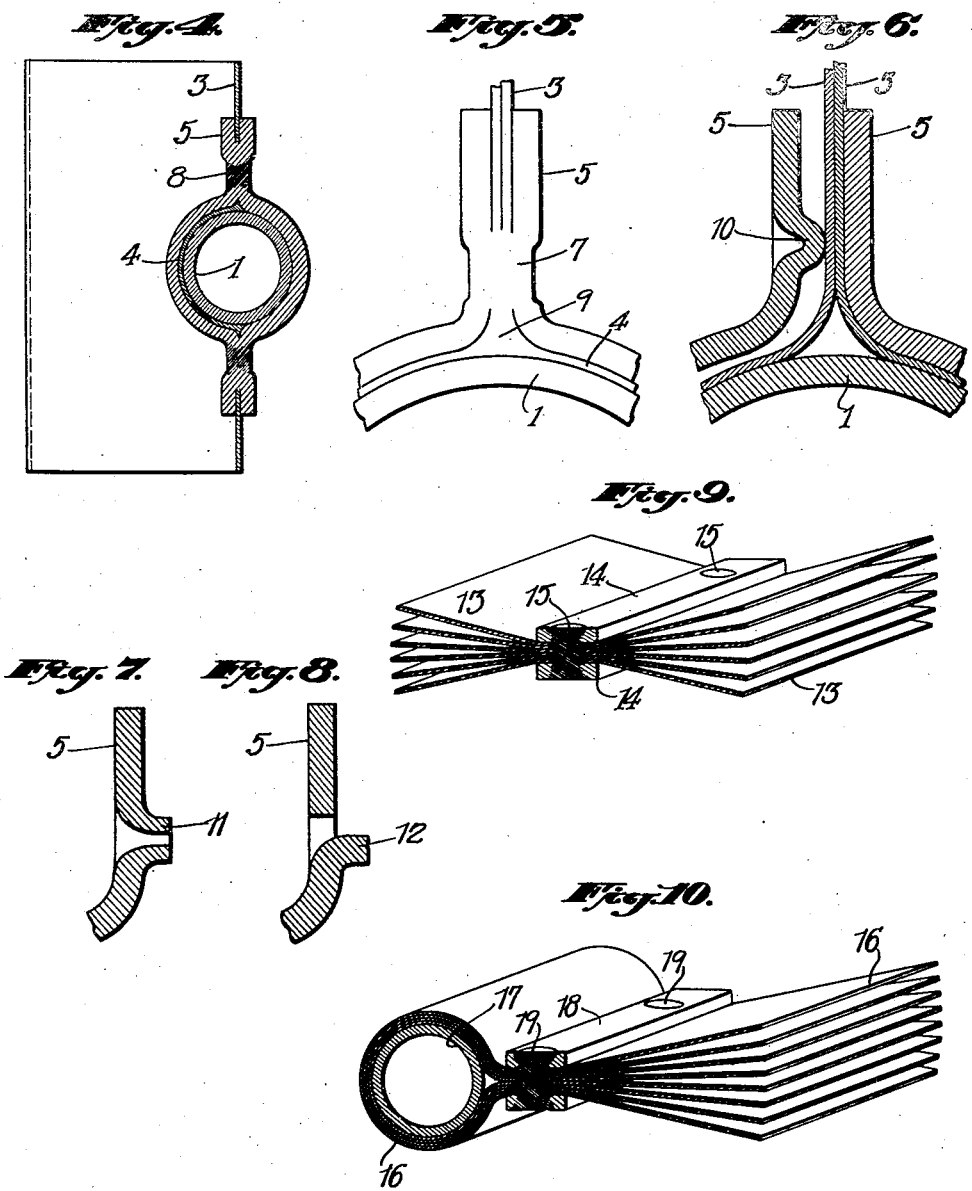

Patented Mar. 18, 1930

1,750,643

UNITED STATES PATENT OFFICE

THOMAS E. MURRAY, JR., AND IRVING T. BENNETT, OF BROOKLYN, NEW YORK; SAID BENNETT ASSIGNOR TO THOMAS E. MURRAY, OF BROOKLYN, NEW YORK

WELDING COPPER AND THE LIKE

Application filed July 5, 1927. Serial No. 203,438.

The invention aims to provide certain improvements in the uniting of certain metals by which a better and more durable union can be obtained than by previous methods. There are difficulties in the ordinary methods of butt, spot, projection or similar welding when applied to metals whose electrical and thermal conductivity is high. Such for example are copper, aluminum and brass,—particularly the first. The present invention provides a method having advantages referred to hereinafter in the making of all welded joints and particularly in the welding operations and methods above named.

The accompanying drawings illustrate applications of the invention.

Figs. 1 and 2 illustrate in successive stages the uniting of a radiating structure to a steam pipe in the making of radiators;

Fig. 3 is a side elevation of part of such a radiator;

Fig. 4 is a view similar to Fig. 2 of a modified structure;

Fig. 5 is an enlarged diagram illustrating the structure of the weld;

Figs. 6, 7 and 8 are sectional views before welding illustrating methods differing in detail; and Figs. 9 and 10 are sectional views of other applications of the invention.

Figs. 1 to 8 illustrate the application to a steam pipe 1 of a radiating structure comprising metal sheets corrugated in horizontal section to form laterally extending fins 2 and longitudinally extending portions 3 which are bent outwardly at intervals to form recesses 4 embracing the pipe 1 between them. The corrugated plates are preferably of copper or copper alloy, though other metals may be used. It is important in uniting the parts of such a radiator to make a joint which is not liable to loosen under the expansion and contraction of the parts. The spot welding of copper is almost or quite impracticable because of the rapid conduction of the current and the heat from the points to be joined as well as the high electrical conductivity of the metal itself.

This difficulty is avoided by the present invention however. Welding straps 5 of iron or steel are provided with recesses 6 so that they embrace the copper sheet around and at points beyond the pipe. The opposite straps 5 are then welded to each other to form joints 7 extending between the opposite steel or iron straps 5 and through the copper plates 3.

Fig. 4 shows a similar method of attaching a single copper plate 3 to the pipe 1. A copper plate is recessed at 4 to extend partly around the pipe. Steel straps 5 similar to those of Fig. 1 are placed in position and welded to each other as at 8 through the single copper sheet 3 so as to unite the pipe to the sheet.

The method is particularly useful in uniting sheets of copper to one another or in uniting a sheet of copper to some other part such as the steam pipe illustrated by Fig. 4. And for making a joint with copper, the straps are preferably of steel. But the invention may be applied to making joints with various other metals instead of copper, and using straps or similar pieces of metal having a lower conductivity than that through which the weld extends.

Fig. 5 illustrates the structure of the resulting weld. The metal of the straps 5 is pressed in slightly at the joint. The heat and pressure cause the interposed sheets 3 at this point to alloy with or dissolve into the steel so that the central portion of the joint 7 is of a copper iron alloy. At the same time some of the copper from the sheets 3 is softened and forced down in the form of a fillet 9 against the pipe 1. This fillet and the recessed portions 4 are pressed so closely against the pipe as in their heated condition to make a very intimate union with the latter.

The invention may be applied to various kinds of electric welding. Figs. 6, 7 and 8 illustrate the use of the projection method in which, in order to localize the heat, a projection is formed between the parts to be welded. In Fig. 6, one of the straps 3 is provided before welding with a pressed out portion 10. Or there may be provided, as in Fig. 7, a tubular projection 11 punched out from the strap. Or as in Fig. 8, a projection 12 may be provided by splitting the strap and bending it out in the form of a tongue. Various other methods are known of forming such projections. It is preferable to provide projections on only one of the two co-operating straps. This is sufficient to secure a good weld and avoids the necessity of bringing projections from two opposite straps into accurate registration with each other.

Where an additional part is to be assembled with the copper sheet or sheets, such as the pipe 1, the outside welding piece is preferably in the form of a strap passing around the additional part. Fig. 4 illustrates a single strap for a single tube 1. Fig. 3 illustrates the application of the radiating structure to a pipe arranged in three successive lengths, with a single strap extending over all the joints in a vertical line. In assembling other structures by this method, pieces of steel or the like of various other shapes may be used instead of straps.

The improved welds provide a strong and durable connection and are well adapted to economical production. Each weld requires a comparatively small quantity of electrical current so that a large number of such welds may be made at one operation by an apparatus having electrodes at the desired locations. For example, the six joints shown in Fig. 3 may be made at one operation. Or several such groups of six joints each may be made to unite the whole or any part of the assembled structure at one operation. A suitable apparatus for this purpose is illustrated in pending application, Serial No. 91,023 filed February 27, 1926. The radiator and welded structures disclosed herein are claimed in a separate application No. 203,437, filed July 5, 1927.

The previously described figures illustrate the application of the invention to either one or two copper sheets to be joined. The number may be increased. Fig. 9 shows the invention applied to the uniting of six sheets 13 of copper by means of steel strips 14 with spot welds 15 at intervals between the opposed steel strips extending through the copper sheets.

Fig. 10 illustrates the invention applied to the assembling of eight sheets 16 of copper passed around a steel tube 17 and welded together by bars 18 of steel with spot welds 19 at intervals between the steel strips and extending through the copper sheets; the latter being flared to provide 8 separate fins. In this way a large surface is made available to transfer heat to or from the restricted area of the pipe. The radiator described herein is the subject of a separate application co-pending herewith.

The invention is useful also where the sheets through which the weld is passed are of different metals; as for example, one of copper and one of aluminum. In certain cases also it will be advantageous to utilize the invention by welding two outer pieces through an intermediate piece or pieces of metal the same as or similar in conductivity to the outer pieces.

The use of steel (in which term I include ferrous metals generally) for straps in a radiator having the heating element or the radiating structure or both of copper (in which term I include cuprous metals generally) has this peculiar advantage. The steel has a lower coefficient of thermal expansion than the copper. Consequently when steam is passed through the copper tube and the latter is heated, it expands to a greater extent than the steel straps which are firmly united about it. Consequently the degree of contact between the heating element and the radiating structure is increased.

It is of prime importance that the radiating structure shall make as intimate contact as possible with the heating element so as to conduct the heat from the latter as rapidly as possible and this purpose is greatly aided by the comparative expansion of the copper parts and the steel straps when the radiator is heated. There will be some expansion of the steel straps; but this will be within the elastic limit so that when the radiator is cooled the straps will be restored to their original dimensions and will hold the parts of the radiator together with substantially their original efficiency.

Various other modifications may be made by those skilled in the art without departing from the invention as defined in the following claims.

What we claim is:—

1. The method of making a lap joint between two pieces of metal of comparatively high conductivity which consists in applying at opposite sides thereof pieces of metal of comparatively low conductivity and electrically welding the latter together through the metal of the pieces of higher conductivity.

2. The method of making a lap joint between two pieces of copper or the like which consists in applying at opposite sides thereof pieces of steel and electrically welding the latter through the pieces of copper.

3. The method of uniting two sheets of copper with a third element embraced between them which consists in applying at opposite sides of the copper at points adjacent to the third element, pieces of steel and electrically welding the latter to each other through the copper.

4. The method of uniting a plurality of sheets of metal of comparatively high conductivity which consists in applying at opposite sides thereof pieces of metal of comparatively low conductivity and electrically welding the latter to each other through the sheets of higher conductivity.

5. The method of applying a radiating structure to the heating element of a radiator which consists in assembling said radiating structure and heating element between pieces of metal having a lower coefficient of thermal expansion than said heating element and welding such parts to each other through the radiating structure at points adjacent to the heating element so that when the radiator is heated the degree of contact between the rediating structure will be increased.

6. The method of applying a radiating structure to a copper heating element of a radiator which consists in assembling said radiating structure and heating element between pieces of steel and welding said pieces of steel to each other through the radiating structure and adjacent to the heating element so that when the radiator is heated the comparative expansibility of the copper and steel will increase the degree of contact between the heating element and the radiating structure.

7. The method of uniting a sheet metal radiating structure to the copper tube of a radiator which consists in shaping the radiating structure to fit the tube at opposite sides, assembling the parts with the radiating structure embracing the tube, applying steel straps fitting the outer face of the portions of the radiating structure which embrace the tube and welding said straps to each other through the radiating structure at points adjacent to the tube so that when a heating medium is passed through the tube the latter will expand to a greater extent than the straps and will increase the degree of contact between the tube and the radiating structure.

In witness whereof, we have hereunto signed our names.

THOMAS E. MURRAY, Jr.
IRVING T. BENNETT.